Patented May 27, 1947

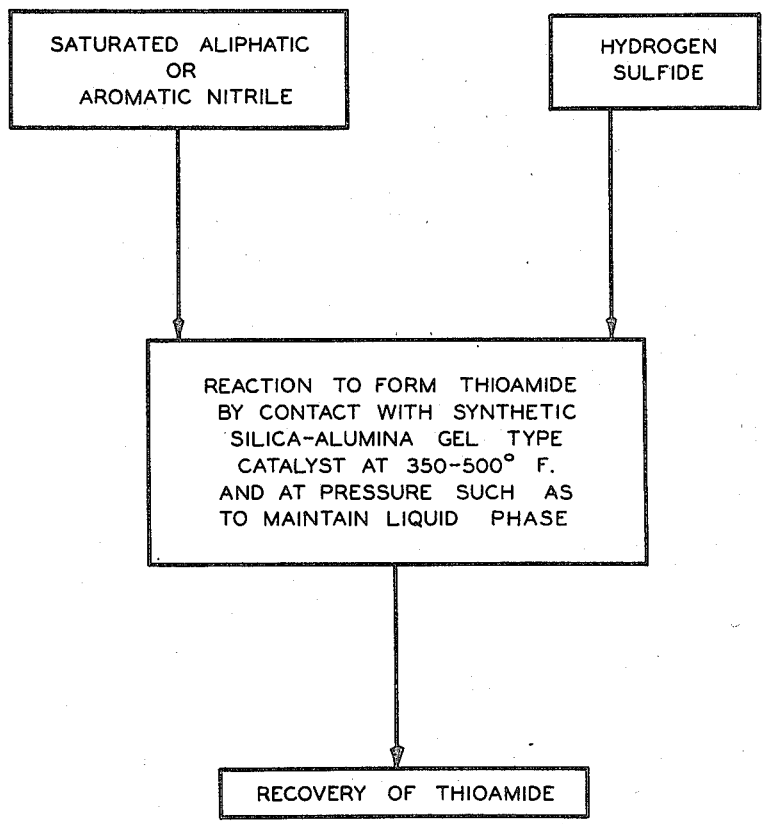

2,421,031

UNITED STATES PATENT OFFICE 2,421,031

PROCESS FOR SYNTHESIS OF THIOAMIDES

John E. Mahan, Bartlesville, Okla., assignor to Phillips Petroleum Company, a corporation of Delaware Application September 10, 1945, Serial No. 615,347

15 Claims. (Cl. 260—551)

This invention relates to a novel process for the synthesis of thioamides and especially to such a process wherein simple aliphatic or aromatic nitriles and hydrogen sulfide are used as starting materials.

The objects of this invention are: to provide a new and improved process for the production of thioamides; to provide a process for synthesis of thioamides from the corresponding nitriles and hydrogen sulfide; to effect the interaction of nitriles with hydrogen sulfide over selective contact catalysts in such a manner that the corresponding thioamide is the principal reaction product; to provide a process for the synthesis of aliphatic thioamides from aliphatic nitriles and hydrogen sulfide; to provide a process of the foregoing type in which the reaction stops at the thioamide with formation of little or none of the dithiocarboxylic acid by reaction of a second molecule of hydrogen sulfide; to provide a process of the foregoing type which is especially adapted to the use of simple, i. e., unsubstituted, aliphatic saturated and aromatic nitriles. Many other objects will hereinafter appear.

The accompanying drawing portrays diagrammatically a preferred embodiment of the process of the present invention.

Acid amides are potentially very valuable chemicals and have found many important applications. Still wider use and application of these compounds, particularly of the higher members of the series, has been restricted because of the unavailability and high cost of those amides above acetamide which have suitable properties for many uses. Similarly thioamides, in which an atom of sulfur replaces the oxygen atom of ordinary amides, have many desirable properties and potentialities as intermediates for chemical syntheses and direct industrial application.

Solvent and plasticizing properties are extraordinarily great in the amides and thioamides; and members of this series are useful in resins and plastics, leather treating, rubber compounding, paint and varnish preparation, and in adhesives. Solvent properties for both organic and inorganic compounds makes their widespread use possible when and if adequate supplies become available at reasonable cost.

Heretofore the synthesis of thioamides has been accomplished through the action of such reagents as phosphorus pentasulfide on amides, or on the corresponding carboxylic acids or their ammonium salts. These routes all have the disadvantage of being indirect, in most cases requiring several steps to synthesize the required amides or acids. Phosphorus pentasulfide is a relatively expensive reagent which is consumed in the process, and its action is rather severe and results in considerable loss or destruction of the organic compounds.

More recently, it has been found that limited yields of thioamides can be obtained by reaction of nitriles with hydrogen sulfide. Nitriles offer many attractive possibilities in the synthesis of amides. They are now readily available by synthesis from the very plentiful olefinic and acetylenic hydrocarbons resulting from petroleum refining processes and the like. Thus, the preparation of acetonitrile by addition of ammonia to acetylene is well known. In my co-pending application (Ser. No. 589,457, filed April 20, 1945), I have shown that it may readily and cheaply be made in high yield by catalytic interaction of ammonia with olefins of from three to five carbon atoms. I have also shown in a copending application (Ser. No. 567,779, filed December 11, 1944) that saturated nitriles are readily prepared from the action of hydrogen cyanide on olefin oxides. It has been further shown in copending applications of another and myself that hydrogen cyanide adds to acetylenes (Ser. No. 559,840, filed October 21, 1944) and diolefins (Ser. No. 563,744, filed November 16, 1944) to yield unsaturated nitriles, which may be hydrogenated to the saturated type. It is therefore possible to proceed directly from a plentiful byproduct unsaturated hydrocarbon by one or two simple steps to the nitrile raw materials required for a synthesis of thioamides by the process of the present invention.

While the reaction of hydrogen sulfide with nitriles is a most desirable route to the thioamides, it has not heretofore been possible to apply this reaction to large scale production in a practicable manner. The yields of thioamides formed have been small, and the recovery of unreacted nitrile poor, due to decomposition reactions resulting from the conditions imposed, etc. Other and less desirable routes have been used in preference to that from the nitriles for these reasons.

I have now found that it is possible to effect the conversion of nitriles to thioamides by reaction with hydrogen sulfide and in high yields by passing a mixture of the two containing considerable molecular excess of the nitrile over certain heterogeneous contact catalysts at elevated temperature. Reaction does not continue beyond the first step in which one molecule of hydrogen sulfide reacts to form the thioamide and little or none of the dithiocarboxylic acid resulting from reaction of a second mol of H₂S is formed. Decomposition of the nitrile and the thioamide product is at a minimum so that the process is highly efficient. The unreacted excess nitrile is recovered and continuously recycled with more fresh feed so that substantially complete conversion is eventually effected.

In a more specific embodiment, my invention comprises passing a mixture of liquid acetonitrile or other aliphatic or simple aromatic nitrile with hydrogen sulfide over a solid contact catalyst, under superatmospheric pressure sufficient to maintain the mixture in the liquid phase at the temperature of from 200 to 700° F. required. Hydrogen sulfide is used in the smaller molecular proportion and generally the quantity of nitrile will be from two mols to ten mols or more to one of hydrogen sulfide. The catalyst which I have found most suitable for the reaction comprises a synthetic silica-alumina gel catalyst. When operating with acetonitrile I have found a temperature of about 500° F. and a pressure of 1000 p. s. i. g. to be convenient. Using an excess of acetonitrile in the ratio of about five to ten mols to one of hydrogen sulfide, a flow rate of 0.5 liquid volume of feed per volume of catalyst space per hour has been found to yield good conversions. The yield of thioacetamide produced may be made substantially equivalent to the hydrogen sulfide charged, or if desired, somewhat lower conversions may be carried out. The thioacetamide, being solid, is easily separated from the unreacted nitrile by a simple atmospheric distillation and is recovered and purified by crystallization, distillation at reduced pressure or other suitable means. The acetonitrile is recycled to the unit, together with any unreacted hydrogen sulfide which is distilled off with it, and with added fresh nitrile feed and hydrogen sulfide to restore the volume and composition of the feed stream, so that continuous operation is achieved. When I operate with other homologous aliphatic nitriles minor adjustments are made in operating conditions and recovery procedure to yield the best results.

It is an advantage of my process that it can be operated in a direct and continuous manner, with the many great advantages in operation and plant capacity of such processes over the batch type. It is a further advantage that no contaminants are added to the reaction stream as catalysts, such as for instance acids or bases. In the heterogeneous contact catalytic process which I operate, using stationary catalyst beds of substantially neutral material, no harmful effects on the reactants or products result. Contact wtih peroxides is also avoided. Purification difficulties are reduced to a minimum, the thioamides resulting being made available in very high purity, and the unconverted nitrile being suitable for recycling without extended purification.

The synthetic silica-alumina catalysts which I use in my process are most accurately described as dried gels and are characterized by their chemical composition, their physical properties and specific methods of preparation which account for their catalytic activity. Although these catalysts are broadly referred to as silica-alumina compositions, it is important to further define the origin, physical structure and chemical composition in order to differentiate the catalysts most active in the present process from the naturally occurring minerals which contain the same components but which have less activity in my process.

The natural and synthetic aluminum silicates were originally studied with respect to their polymerizing qualities and it was noted that catalysts of superior activity resulted from synthetic preparations involving precipitation of the oxides in gel form and not necessarily in the proportions found in nature. The gel structure was usually essential. Suitable silica-alumina catalysts have been prepared by the methods described by McKinney in U. S. Patents 2,142,324 and 2,147,985 and employed in polymerization of gaseous olefins. Subsequently they have been found extremely useful in alkylation of benzene with olefins, in dealkylation, and other processes.

In general, these catalysts are prepared by first forming a hydrous silica gel from an alkaline silicate and an acid, washing soluble material from the gel, treating or activating the gel with an aqueous solution of a suitable aluminum salt and subsequently washing and drying the treated material. In this manner, part of the alumina, probably in the form of a hydrous oxide, is selectively adsorbed by the hydrous silica and is not removed by subsequent washing. Modifications may be made in the foregoing procedure and catalysts of suitable activity may result. Whether prepared by exactly this method, or some other, the catalyst will contain a major portion of silica and a minor portion of alumina. This minor proportion of alumina will not generally be in excess of about 10 per cent by weight and will more often be between about 0.1 and 1.5 or 2 per cent by weight.

While synthetic silica-alumina gel type catalyst especially that prepared by activation of silica gel while in the hydrous state with alumina by impregnation with an aqueous solution of an aluminum salt such as the sulfate or nitrate is the preferred catalyst for use in the process of the present invention, I may less preferably employ other solid contact catalysts of somewhat similar nature which possess suitable activity for the reaction such as certain of the natural clay minerals, such as fuller's earth activated by heating, acid-treated montmorillonite, and the like. Silica gel, on the one hand, and activated alumina granules, on the other, are also active. Other contact catalysts have not been found usable, and the group which is satisfactory includes only the two above-mentioned active oxides, namely, active silica and active alumina and the natural and synthetic active combinations thereof. All of these materials are rugged and have long active life periods, and withstand continued handling and heating.

Synthetic silica-alumina catalysts are most highly preferred because they enable superior yields of thioamides to be obtained, and excellent recovery of unreacted nitrile because of the very limited extent of decomposition reactions.

Before using the catalyst in my process I give it a preliminary activity treatment which comprises heating for a period in a stream of air, or preferably inert gas, to a temperature of about 100–200° F. above that contemplated in operation. This removes adsorbed water from the catalyst and prevents catalytic hydrolysis of the nitrile thereby which may take place in preference to the reaction with hydrogen sulfide.

The process of this invention is carried out in the substantially anhydrous state, i. e., with the reactants and the reaction zone as free from free water as is commercially feasible.

The operating temperatures in my process may broadly be within the limits of about 200 to 700° F. although I generally prefer to operate at from 350 to 550° F. In the lower ranges, conversion is reduced and at temperatures in excess of 700°, or below in some cases, decomposition reactions of nitrile or thioamide become too great to be tolerated. When preparing thioacetamide from acetonitrile I have found the range 480–500° F. to be very satisfactory.

While superatmospheric pressures are essential in the process I have found that as long as the pressure is high enough to maintain the feed in the liquid phase at the temperature of operation the operating range is not critical. Many obvious advantages in high pressure operation exist, such as increased throughput and suppression of splitting reactions but the cost of equipment mounts rapidly as pressure increases. I have found a pressure of 1000 pounds per square inch gage a convenient pressure when making thioacetamide by my process.

The flow rates used may be between about 0.2 to 2.0 liquid volumes per volume of catalyst per hour. Rates near 0.5 volume per volume of catalyst space per hour are often most convenient, resulting in substantially complete reaction without extensive decomposition. The flow rates calculated on the basis of the void space in the catalyst chamber are, of course, considerably higher. When using the silica-alumina catalyst, a flow rate of 0.5 liquid volume per volume catalyst space per hour is equivalent to approximately 1.25 volumes per volume void space.

The ratio of nitrile to hydrogen sulfide I have found to be preferably above 2 to 1. It may be used as high as desired, for example, as high as 10 to 1 or even higher, but generally little benefit is gained in going beyond about four or five to one, and reduced production per pass results from reducing H₂S content further than needed. In the case of higher aliphatic nitriles, say those containing more than three carbon atoms per molecule, the solubility of H₂S in the nitrile may limit the amount used, however. In these cases, or in others if desired, I may operate with the use of an inert third component, in which both the nitrile and H₂S are miscible.

Carbonaceous deposits gradually build up on the catalyst in normal operation and from time to time the activity of the catalyst will require revivification. This may be done in a manner well known in catalytic processes by passing a controlled stream of oxygen containing gas and removing the deposits by combustion. The process may be made cyclic, with regular intervals of processing and regeneration of some hours duration, or as conditions are milder, operation may continue many hours or days with only occasional short periods of regeneration.

In order to avoid production of the oxygen-containing amides rather than the desired thioamides, which I have found are readily produced by hydrolysis over this catalyst, it is obviously necessary to keep the nitrile feed and hydrogen sulfide stream dry or substantially so, and to prevent the accumulation of water on the catalyst during regeneration periods.

While I have described the reaction of hydrogen sulfide on saturated aliphatic nitriles and especially acetonitrile it is to be understood my process is equally applicable to simple aromatic nitriles and to certain substituted nitriles where-in the substituent is not readily broken off. In general, unsaturated nitriles are not applicable, due to the action of the hydrogen sulfide on the unsaturated linkage.

The following specific example illustrates how my process is carried out in practice.

*Example*

A steel tube one inch in diameter was charged with 105 ml. of 8–14 mesh synthetic silica-alumina catalyst containing 1.0 per cent alumina and prepared by activation of the hydrous silica gel with an aluminum salt in the manner described above. It was maintained at a temperature of 490–500° F. while a mixture of 80 mol per cent acetonitrile and 20 mol per cent hydrogen sulfide was passed through it at a flow rate of 0.50 liquid volume per volume of catalyst space per hour at a pressure of 1000 p. s. i. g. A yield of thioacetamide equivalent to 85 per cent of the hydrogen sulfide charged was recovered. It had a melting point of 109–110° C. The unreacted portion of the nitrile was recovered in 95 per cent yields and continuously recycled to the process. After 24 hours operation the catalyst showed only a slight discoloration from carbonaceous deposits.

I claim:

1. The process of synthesizing a thioamide from the corresponding nitrile which comprises contacting a mixture of said nitrile and hydrogen sulfide with a solid contact catalyst selected from the group consisting of active silica, active alumina, and natural and synthetic active combinations of silica and alumina at an elevated temperature and at a pressure such as to maintain the reactants in liquid phase.

2. The process of synthesizing a thioamide from the corresponding nitrile which comprises contacting a mixture in which the reactants consist of said nitrile and hydrogen sulfide with a solid contact catalyst selected from the group consisting of active silica, active alumina, and natural and synthetic active combinations of silica and alumina at a temperature of from 200 to 700° F. and at a superatmospheric pressure sufficient to maintain the reactants in liquid phase.

3. The process of claim 2 wherein said nitrile is present in said mixture in molecular excess over said hydrogen sulfide.

4. The process of claim 2 wherein said nitrile is present in said mixture in an amount such as to give a molar ratio of nitrile to hydrogen sulfide of at least 2 to 1.

5. The process of claim 2 wherein said nitrile is present in said mixture in an amount such as to give a molar ratio of nitrile to hydrogen sulfide of from 2 to 1 up to 10 to 1.

6. The process of claim 2 wherein the reactants and the reaction zone are maintained substantially anhydrous throughout the reaction.

7. The process of claim 2 wherein the catalyst is preliminarily activated by heating in a stream of gas to a temperature of 100–200° F. above that employed in the reaction for a period of time sufficient to remove all water therefrom and activate same.

8. The process of claim 2 wherein said nitrile is acetonitrile and wherein said thioamide is thioacetamide.

9. The process of claim 2 wherein said catalyst is silica gel activated with from 0.1 to 10 weight per cent of alumina.

10. The process of claim 2 wherein said nitrile and hydrogen sulfide are used in such proportions that they are not completely miscible and wherein an inert mutual solvent therefor is employed in such proportions as to give a homogeneous solution.

11. The process of synthesizing a thioamide from the corresponding nitrile which comprises contacting a mixture of said nitrile and hydrogen sulfide with a synthetic silica-alumina gel catalyst at a temperature of from 350 to 550° F. and at a pressure such as to maintain the reactants in liquid phase, and recovering said thioamide from the resulting reaction mixture.

12. The process of synthesizing an unsubstituted saturated aliphatic thioamide which consists of contacting a mixture consisting of an unsubstituted saturated aliphatic nitrile and hydrogen sulfide with a synthetic silica-alumina gel catalyst at a temperature of from 350 to 500° F. and at a pressure such as to maintain the reactants in liquid phase, and recovering said thioamide from the resulting reaction mixture.

13. The process of synthesizing thioacetamide from acetonitrile which comprises contacting a mixture consisting of acetonitrile and hydrogen sulfide in which the molar ratio of acetonitrile to hydrogen sulfide is at least 2 to 1 with a synthetic silica-alumina gel catalyst at a temperature of from 480 to 500° F. and a pressure of approximately 1000 pounds per square inch gage.

14. The process of synthesizing thioacetamide from acetonitrile which comprises contacting a mixture consisting of approximately 80 mol per cent of acetonitrile and 20 mol per cent of hydrogen sulfide with a synthetic silica-alumina gel type catalyst, prepared by activating silica gel with from 0.1 to 2 per cent by weight of alumina at a temperature of 480 to 500° F. and a pressure of approximately 1000 pounds per square inch gage and at a flow rate of 0.50 liquid volumes of said mixture per volume of catalyst space per hour.

15. The process of synthesizing an unsubstituted saturated aliphatic thioamide which consists of contacting a mixing consisting of an unsubstituted saturated aliphatic nitrile and hydrogen sulfide, the molecular ratio of said nitrile to said hydrogen sulfide being in excess of 2 to 1, with a synthetic silica-alumina gel catalyst prepared by forming a hydrous silica gel from an alkaline silicate and an acid, washing soluble material from the gel, activating the washed gel while in the hydrous state with an aqueous solution of an aluminum salt and subsequently washing and drying the treated material to yield a catalyst containing from 0.1 to 10 per cent by weight of alumina, conducting said contacting step at a temperature of from 350 to 500° F. and at a pressure such as to maintain the reactants in liquid phase and at a flow rate of from 0.2 to 2.0 liquid volumes per volume of catalyst per hour, and recovering said thioamide from the resulting reaction mixture.

JOHN E. MAHAN.

REFERENCES CITED

The following references are of record in the file of this patent:

UNITED STATES PATENTS

| Number | Name | Date |
|---|---|---|
| 2,357,484 | Martin | Sept. 5, 1944 |

OTHER REFERENCES

Kindler Liebigs Annalen, vol. 431, (1923), pp. 202-4.

Kindler Liebigs Annalen, vol. 450, (1926), p. 8, p. 12.

Kindler Liebigs Annalen, vol. 452, (1927), pp. 117, 118.